(12) United States Patent
Kim (10) Patent No.: US 8,816,550 B2
(45) Date of Patent: Aug. 26, 2014

(54) BUS BAR AND EPS MOTOR HAVING THE SAME

(75) Inventor: Byungyong Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 327 days.

(21) Appl. No.: 13/289,654

(22) Filed: Nov. 4, 2011

(65) Prior Publication Data

US 2012/0112582 A1    May 10, 2012

(30) Foreign Application Priority Data

Nov. 5, 2010  (KR) .................. 10-2010-0109896
Nov. 5, 2010  (KR) .................. 10-2010-0109900

(51) Int. Cl.
*H02K 11/00*    (2006.01)

(52) U.S. Cl.
USPC ............................................. 310/71; 310/43

(58) Field of Classification Search
USPC ...................................................... 310/43, 71
See application file for complete search history.

(56) References Cited

U.S. PATENT DOCUMENTS

| 7,498,702 | B2 * | 3/2009 | Migita et al. ............... 310/71 |
| 7,663,277 | B2 * | 2/2010 | Kinoshita et al. ........... 310/71 |
| 2003/0173841 | A1 * | 9/2003 | Kobayashi et al. ........... 310/71 |
| 2003/0201688 | A1 | 10/2003 | Yamamura et al. |
| 2006/0068617 | A1 | 3/2006 | Migita et al. |
| 2007/0278876 | A1 * | 12/2007 | Haga et al. .................. 310/71 |
| 2009/0026859 | A1 * | 1/2009 | Kinoshita et al. ............ 310/71 |
| 2011/0297474 | A1 * | 12/2011 | Aono et al. .................. 180/443 |
| 2012/0126646 | A1 * | 5/2012 | Nakagawa et al. ........... 310/71 |

FOREIGN PATENT DOCUMENTS

| EP | 1677404 A2 | 7/2006 |
| EP | 2139098 A2 | 12/2009 |
| JP | 2000-333400 A | 11/2000 |

OTHER PUBLICATIONS

European Search Report dated Aug. 9, 2012 in European Application No. 11187929.2, filed Nov. 4, 2011.

* cited by examiner

*Primary Examiner* — Thanh Lam (74) *Attorney, Agent, or Firm* — Saliwanchik, Lloyd & Eisenschenk (57) ABSTRACT

Disclosed is a bus bar of an EPS motor configured to improve a terminal structure of a bus bar to enable an easy assembly between a stator and the bus bar, whereby assemblage and operational reliability can be enhanced, the bus bar that is connected to a stator coil of the EPS motor, the bus bar including: an insulator made of insulation materials that forms a body of the bus bar; a lower terminal protrusively formed at a lower side of a periphery of the insulator, and connected to the stator coil; and an upper terminal protrusively formed at an upper side of the periphery of the insulator, and connected to the stator coil, whereby the terminals of the bus bar are divided to an upper terminal and a lower terminal to enhance assemblage and operational reliability by further obtaining a broader mutually discrete gap.

20 Claims, 6 Drawing Sheets

BUS BAR AND EPS MOTOR HAVING THE SAME

CROSS-REFERENCE TO RELATED APPLICATIONS

This application claims the benefit under 35 U.S.C. §119 of Korean Application Nos. 10-2010-0109896, filed Nov. 5, 2010, and 10-2010-0109900, filed Nov. 5, 2010, which are hereby incorporated by reference in their entirety.

BACKGROUND OF THE DISCLOSURE

1. Field of the Disclosure

The present disclosure relates to a bus bar of an EPS motor, and more particularly to a bus bar of an EPS motor configured to improve a terminal structure of a bus bar to enable an easy assembly between a stator and the bus bar, whereby assemblage and operational reliability can be enhanced.

The present disclosure further relates to a mold structure of a bus bar of an EPS motor, and more particularly to a mold structure of a bus bar of an EPS motor configured to fix position of a terminal in an insert molding process of bus bar by improving a terminal structure of the bus bar and to accurately maintain a mutual gap.

2. Discussion of the Related Art

Generally, almost every vehicle employs an electric power-assist steering system. Such an electric power-assist steering system generates an assist force based on the steering torque and the steering angle, so as to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have small size, and are capable of generating high torque. The BLDC motor is a DC motor mounted with an electronic rectifying system, excluding those mechanical contact portions such as a brush and a rectifier from the conventional DC motor. The BLDC motor largely includes a stator and a rotor, where the stator is wound with a coil, and the rotor is coupled to a magnet and rotated by electromagnetic interaction therebetween.

The stator includes a core and a coil, and generally employs a plurality of divided cores these days that are connected in a circular shape.

Figure 1:
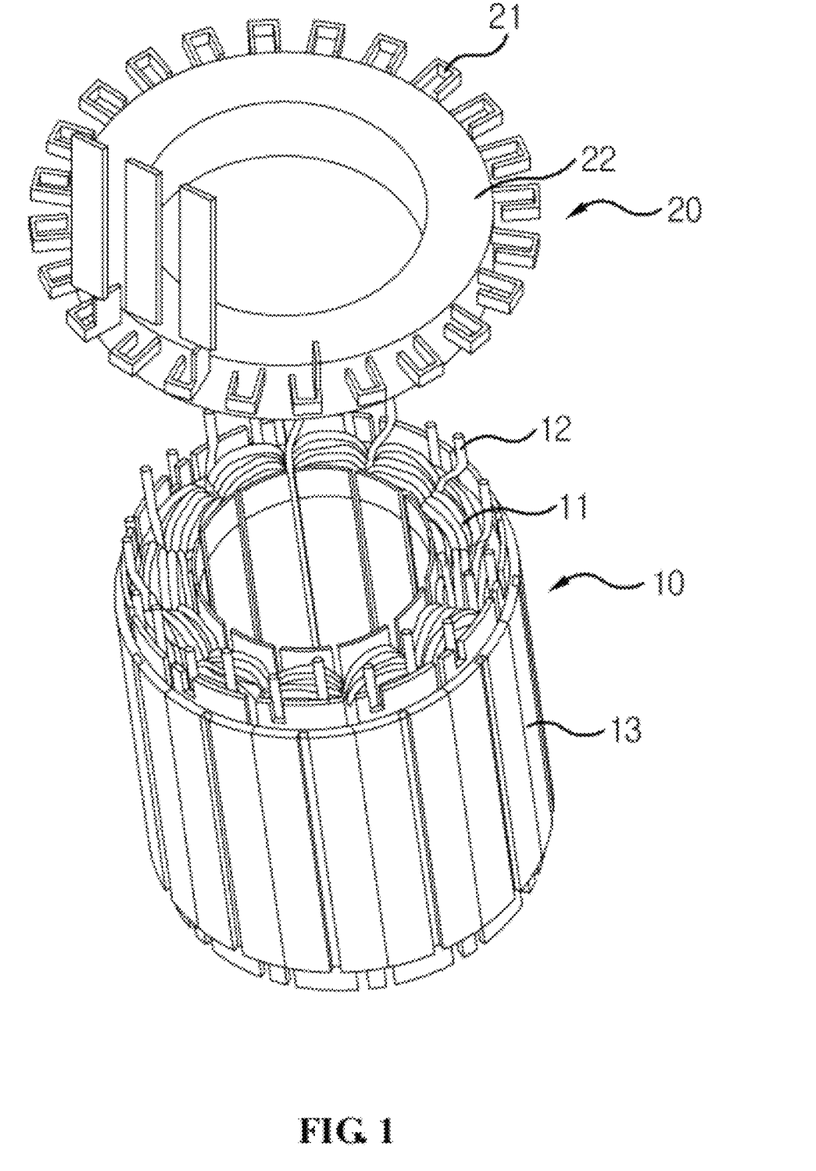
FIG. 1 is a perspective view illustrating a stator and a bus bar of an EPS motor according to prior art.

FIG. 1 is a perspective view illustrating a stator and a bus bar of an EPS motor.

The stator (10) is a member secured inside a housing (not shown) of a motor to generate a rotation movement in response to an electromagnetic interaction with a rotor (not shown) arranged inside a hollow hole, and includes a core (13) and a coil (11) wound on the core (13).

A motor in a vehicle generally uses a plurality of coils connected in parallel to reduce loss caused by coil resistance, as illustrated in FIG. 1. Thus, the coil in parallel connection is extended to input and output terminals from where the connection is integrally performed. In order to integrally connect the parallel arranged coil (11), a bus bar (20) is arranged at an upper side of the stator (10).

Each coil terminal (12) of respectively wound coils (11) is arranged on the upper side of the stator (10), where the bus bar (20) is connected to the coil terminal (12).

The bus bar (20) is securely arranged thereon with a plurality of metal materials electrically connected to the coil terminal (12) and insulated by an insulator (22). The bus bar (20) substantially takes the shape of a doughnut and correspondingly arranged on the upper side of the stator (10). A periphery of the bus bar (20) is arranged with a plurality of terminals (21) for connection with coil terminals (12).

Figure 2:
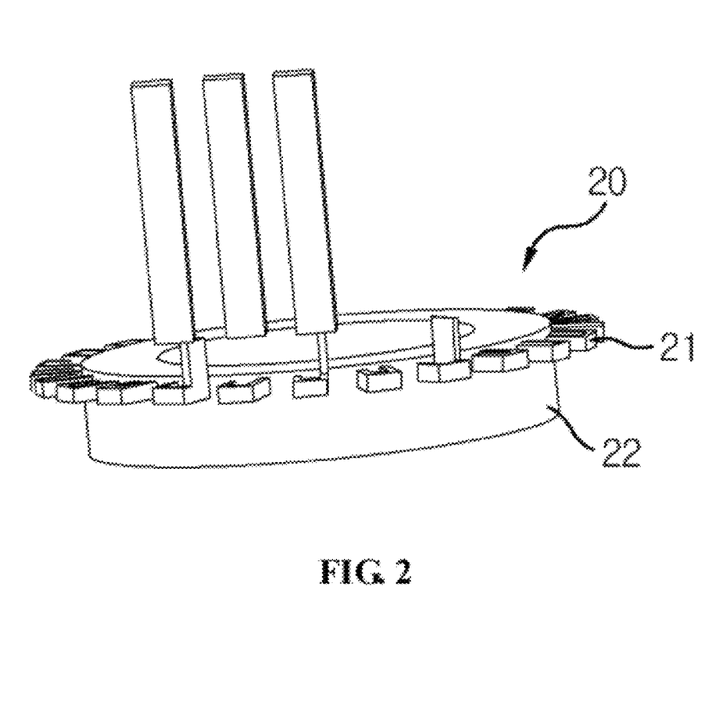
FIG. 2 is a lateral view of the bus bar of an EPS motor according to prior art.

FIG. 2 is a lateral view of the bus bar (20) thus configured.

FIG. 2 illustrates a three-phase circuit, where each input/output terminal is alternatively and sequentially arranged to the periphery of the bus bar (20).

Figure 3:
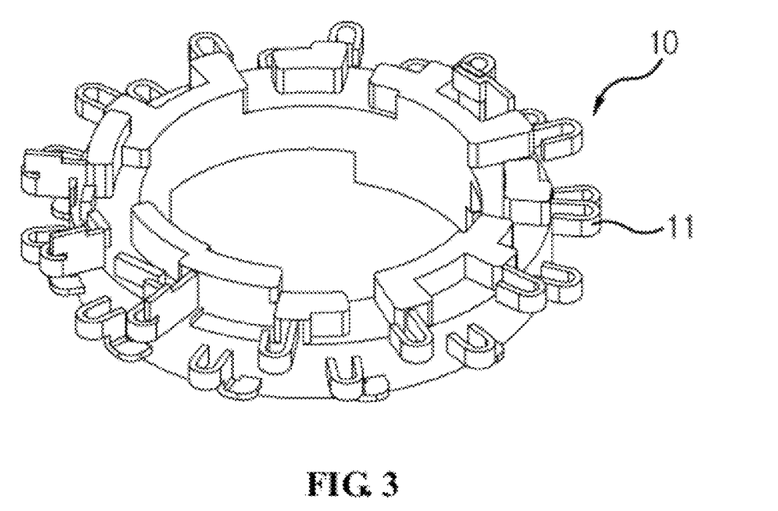
FIG. 3 is a perspective view illustrating a terminal and a body in a bus bar of an EPS motor according to prior art.

FIG. 3 is a perspective view illustrating a bus bar of an EPS motor according to prior art.

The bus bar (20) substantially takes the shape of a doughnut and correspondingly arranged on the upper side of the stator (10). A periphery of the bus bar (20) is arranged with a plurality of terminals (21) for connection with coil terminals. The insulator (22) for securing each position of the terminals (21) insulates the metallic terminals (21) and forms a periphery of the bus bar (20).

Figure 4:
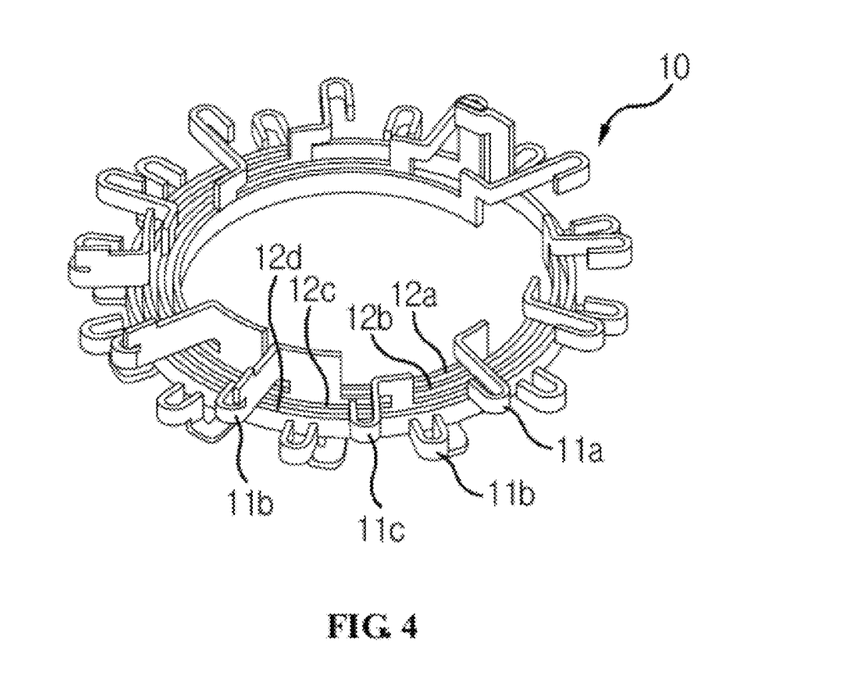
FIG. 4 is a perspective view illustrating a coupled state between a terminal and an insulator in a bus bar of EPS motor according to prior art.

FIG. 4 is a perspective view illustrating the bus bar of FIG. 1 excluded of an insulator.

Each terminal (21a, 21b, 21c, 21d) shows a different polarity at the three phase circuit. Terminals of same type are mutually connected by ring-shaped body units (12a, 12b, 12c, 12d). The body unit sequentially and circumferentially includes the first body unit (12a), the second body unit (12b), the third body unit (12c) and the fourth body unit (12d).

Each of the body units (12a, 12b, 12c, 12d) takes the shape of a thin ring, is insulated by the insulator (22) and secured to a position. The terminals (21a, 21b, 21c, 21d) and the body units (12a, 12b, 12c, 12d) are mutually insulated in a narrow space. The insulator (22) is arranged in a space formed by the terminals (21a, 21b, 21c, 21d) and the body units (12a, 12b, 12c, 12d), and insulates the terminals (21a, 21b, 21c, 21d) from the body units (12a, 12b, 12c, 12d).

The insulator (22) takes a shape by injection-molding a resin material after properly positioning the terminals (21a, 21b, 21c, 21d) and the body units (12a, 12b, 12c, 12d ) in a mold.

Meanwhile, a dielectric breakdown in a product among terminals may be generated to result in imperfection in motor operation and defect affecting safety of an operator, if a predetermined gap is not maintained among the terminals during insert molding operation. Another problem is that the insert molding operation cannot be easily performed due to a tight gap among parts and materials of thin thickness.

Still another problem is that a spatial restriction is generated during welding operation of coil terminals (21) due to the tight gap among terminals (21), if the terminals (21) are arranged in the above manner. Still further problem is that an electrical insulation cannot be realized due to undesirable contact to welded portions among adjacent terminals (21) that is generated by the tight gap among terminals (21) in the welding operation.

BRIEF SUMMARY

The present disclosure is directed to cope with the above-mentioned problems/disadvantages and it is an object of the present disclosure to provide a bus bar of an EPS motor configured to enable an easy assembly between a stator and the bus bar to the advantage of enhanced assemblage and operational reliability by improving a terminal structure of a bus bar.

Technical problems to be solved by the present disclosure are not restricted to the above-mentioned description, and any other technical problems not mentioned so far will be clearly appreciated from the following description by the skilled in the art.

In one general aspect of the present disclosure, there is provided a bus bar of an EPS motor that is connected to a stator coil of the EPS motor, the bus bar comprising: an insulator made of insulation materials that forms a body of the bus bar; a lower terminal protrusively formed at a lower side of a periphery of the insulator, and connected to the stator coil; and an upper terminal protrusively formed at an upper side of the periphery of the insulator, and connected to the stator coil.

Terminals of the bus bar are arranged at upper/lower sides of the bus bar to enhance assembling and operational reliability by obtainment of a wide discrete gap between the terminals.

Preferably, the upper terminal and the lower terminal are alternatively arranged to a circumferential direction of the insulator, whereby a welding process of distal ends at the stator coil becomes easy.

Preferably, distal ends of the upper terminal and the lower terminal are ring-shaped, whereby assembly process can be easily conducted because the distal ends of the stator coil can be inserted and welded into the ring-shaped terminals.

Preferably, the insulator takes the shape of a hollow cylinder to correspond to an upper surface of the stator, whereby the bus bar can be easily coupled to the stator.

The bus bar of an EPS motor thus configured according to the present disclosure has an advantageous effect in that input/output terminals of the bus bar are vertically, alternatively and circumferentially arranged to broaden a mutual horizontal gap and to efficiently realize an assembly process.

The bus bar of an EPS motor thus configured according to the present disclosure has another advantageous effect in that less undesirable contacts are generated in the welding process to enhance reliability in the assembly process and the operational reliability.

In another general aspect of the present disclosure, there is provided a mold structure of a bus bar of an EPS motor including a plurality of ring-shaped body units each discretely arranged to a circumferential direction, a plurality of terminals each protrusively bent from the body unit to a circumferential direction, and an insulator accommodating inside the body units thereinside, wherein the mold structure further includes a plurality of fixing pins, each axially formed inside the mold, arranged at a space formed by distancing from among the body units during insert molding work, and fixing a radial position of the body unit.

Thus, insert molding work can be easily performed, and an accurate molding of the bus bar can be made possible because the radial position of the terminal can be fixed.

Preferably, the fixing pin is arranged at a bent area of the terminal to fix the position by restricting circumferential movement of the body units and the terminals. Thus, the fixation of radial position of the terminal can improve easiness of insert molding work and accurate molding of the bus bar.

Preferably, the fixing pin includes a plurality of first pins arranged on a circumference corresponding to an innermost space among the body units in the mold, a plurality of second pins arranged on a circumference discrete to a circumferential direction of the arrangement of the first pins, and a plurality of third pins arranged on a circumference discrete to a circumferential direction of the second pins. Therefore, work reliability can be improved in the manufacturing process of bus bar in a three phase circuit.

Preferably, the fixing pin includes a plurality of first pins arranged on a circumference corresponding to an innermost space among the body units in the mold, a plurality of second pins arranged on a circumference discrete to a circumferential direction of the arrangement of the first pins, and a plurality of third pins arranged on a circumference discrete to a circumferential direction of the second pins. Therefore, work reliability can be improved in the manufacturing process of bus bar in a three phase circuit.

Preferably, the terminal includes an upper terminal arranged at an upper circumferential surface of the insulator and a lower terminal arranged at a lower circumferential surface of the insulator, wherein the fixing pin is lengthily and axially extended to penetrate upper and lower surfaces of the bus bar. Therefore, the bus bar can be accurately fixed during molding work even if the bent terminal is complicatedly structured.

The bus bar of an EPS motor thus configured according to the present disclosure is advantageous in that radial and circumferential positions can be accurately fixed during insert molding works of terminals of bus bar and body units, whereby insert molding works can be improved to enable an accurate molding of the bus bar.

Another advantage is that work efficiency in the manufacturing process can be increased to improve the operational reliability of bus bar.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, a bus bar of EPS motor according to the exemplary embodiments of the present disclosure will be described in detail with reference to the accompanying drawings.

Figure 5:
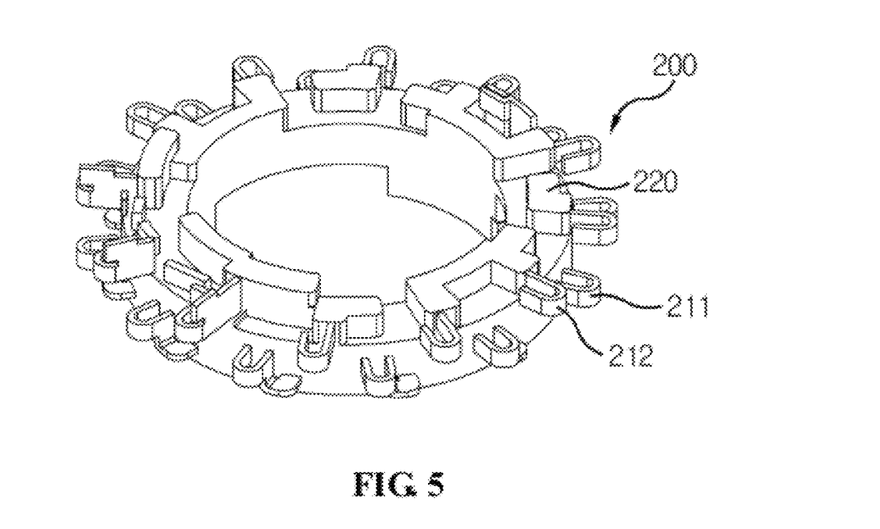
FIG. 5 is a perspective view illustrating a bus bar of an EPS motor according to the present disclosure.

FIG. 5 is a perspective view illustrating a bus bar of an EPS motor according to the present disclosure.

The bus bar (200) includes an insulator (220) forming a body of an exterior look, and a plurality of terminals (211, 212) each connected to a coil (see FIG. 1) of stator. The insulator (220) takes the shape of a substantially hollow holed cylinder, that is, a doughnut shape. The insulator (220) is generally an injection molded resin made of insulating materials.

The insulator (220) is fixedly disposed therein with a plurality of metal members each connecting input/output terminals each electrically insulated by the insulator (220). The metal members are protruded to a periphery of the insulator (220) to be connected to a stator coil.

The terminals (211, 212) which are metal terminals protruded to the periphery of the insulator (220) are discretely arranged to a circumferential direction to allow polarities of adjacent terminals (211, 212) to be alternatively formed. However, as noted above, there is a problem of the plurality of terminals (211, 212) being electrically contacted due to arrangement within a cramped space.

Therefore, based on the concept of the present disclosure, the terminals (211, 212) are separated to an upper side and to a lower side from the periphery of the insulator (220) to become an upper terminal (211) and a lower terminal (212). A collection of terminals each having a different polarity is formed between the upper and lower terminals (211, 212).

Due to the abovementioned arrangement, there is an advantage of broadening a circumferentially discrete gap between the adjacent terminals two or more times than that of the prior art. Meanwhile, each distal end of the terminals (211, 212) is preferably formed in the shape of a ring as illustrated in FIG. 3. Therefore, each of the terminals (211, 212) takes the shape of a hollow holed ring when laterally viewed, and if a distal end of stator coil is inserted therebetween, there is an advantage of easily fixing and welding the position.

Figure 6:
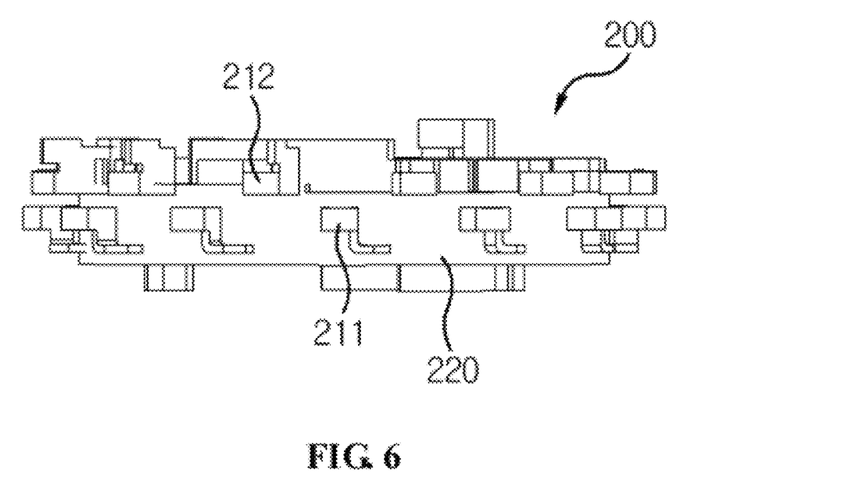
FIG. 6 is a lateral view illustrating a bus bar of an EPS motor according to the present disclosure.

FIG. 6 is a lateral view illustrating a bus bar of an EPS motor according to the present disclosure.

As already described above, the terminals (211, 212) of the bus bar (200) are divided to an upper terminal (212) and a lower terminal (211) from the periphery of the insulator (220).

Preferably, the upper terminals (212) and the lower terminals (211) are alternatively formed, and more specifically, the upper terminals (212) are arranged in the lower terminals (211). Based on the abovementioned arrangement, distal ends of the adjacent coils are respectively brought into contact with the upper terminal (212) and the lower terminal (211) in the process of coupling the bus bar (200) to an upper side of the stator.

The contact between the terminals (211, 212) and the distal ends of the coil is made by way of pressing, thermal caulking or welding method. Generally, a method of contacting a welding rod to the terminal side is employed.

In a case the terminals (211, 212) are arranged as per the above configuration, and the distal ends of the coil are brought into contact with the upper terminal (212) and the lower terminal (211), a welding work is performed to make a complete electrical contact between the terminals (211, 212) and the distal ends of the coil. The welding work is performed by allowing the welding rod to be brought into contact with each terminal side, where if the terminals are arranged based on the concept according to the present disclosure, there is an advantage in that a spacious allowance to insert the welding rod is broadly provided.

The upper terminal (212) or the lower terminal (211) is circumferentially arranged to have the same polarity.

The bus bar of an EPS motor according to the present disclosure thus configured has an advantageous effect in that a space between terminals is greatly enlarged over that of the prior art to provide an easiness in welding work. The bus bar of an EPS motor according to the present disclosure thus configured has another advantageous effect in that obtainment of a welding space can inhibit an undesirable electrical connection, and operational reliability of the EPS motor can be enhanced.

Figure 7:
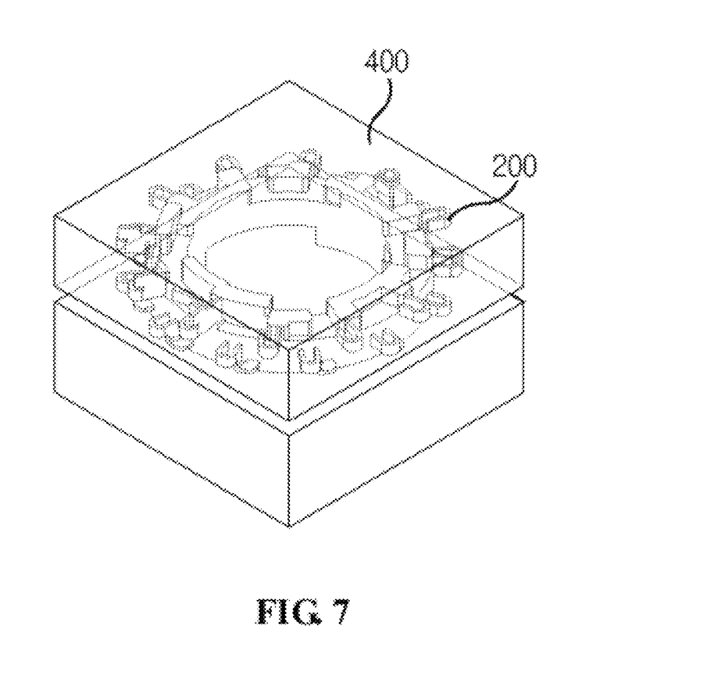
FIG. 7 is a perspective view illustrating a mold for forming a bus bar of an EPS motor according to the present disclosure.
Figure 8:
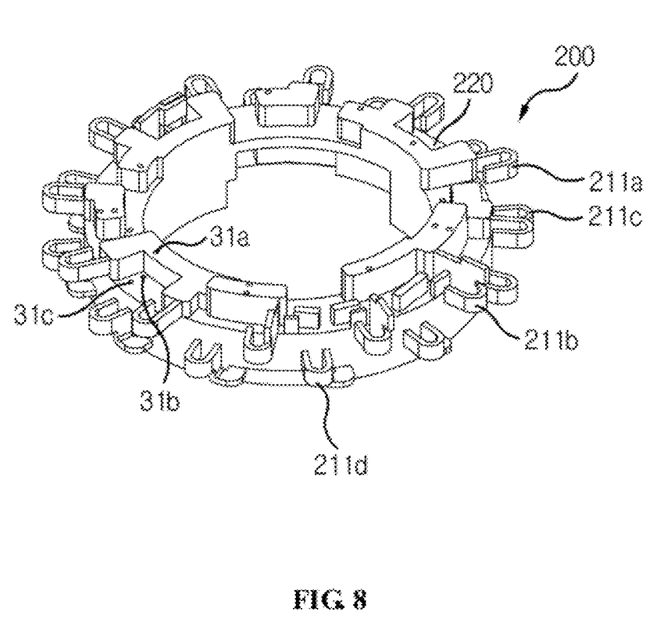
FIG. 8 is a lateral view illustrating a bus bar of an EPS motor according to the present disclosure.

FIG. 7 is a perspective view illustrating a mold for forming a bus bar of an EPS motor according to the present disclosure and FIG. 8 is a perspective view illustrating a bus bar of EPS motor formed by a mold structure according to the present disclosure.

The bus bar (200) includes an insulator (220) forming a body of an exterior look, and a plurality of terminals (21a, 21b, 21c, 21d), each connected to a coil (see FIG. 1) of stator. The insulator (220) takes the shape of a substantially hollow holed cylinder, that is, a doughnut shape. The insulator (220) is generally an injection molded resin made of insulating materials in a mold (400).

The insulator (220) is fixedly disposed therein with a plurality of metal members each connecting input/output terminals each electrically insulated by the insulator (220). The metal members are protruded to a periphery of the insulator (220) to be connected to a stator coil.

The terminals formed by metal conductive materials include body units (12a, 12b, 12c, 12d of FIG. 1) formed inside and outside of the insulator (220) and terminals (211a, 211b, 211c, 211d). Each of the body units (12a, 12b, 12c, 12d) of metal plates forms a concentrical axis, and discretely arranged to a circumferential direction. Furthermore, each of the terminals (211a, 211b, 211c, 211d) is extended from each of the body units (12a, 12b, 12c, 12d) to a circumferential direction, protrusively formed at outside of the insulator (220) and electrically connected to the coil of the stator.

Polarity of each of the terminals (211a, 211b, 211c, 211d) is alternatively arranged to the circumferential direction. The terminals (211a, 211b, 211c, 211d) may be arranged on the same planar surface, but the terminals (211a, 211b, 211c, 211d) may be divisively formed as upper terminals (11a, 11b, 11c) and a lower terminal (11d) from the periphery of the insulator (220). In this case, a gap discrete among the terminals (211a, 211b, 211c, 211d) can be broadly obtained over the terminals (211a, 211b, 211c, 211d) arranged on the same planar surface, such that easiness in welding work and operational reliability can be advantageously enhanced.

Meanwhile, each of the body units (12a, 12b, 12c, 12d) is concentrically distanced from the other body unit, position-fixed in the mold (400) to a circumferential direction and insert molded during insert molding works of resins, where as noted there may occur a problem in position fixing.

Therefore, it is preferable that a fixing pin (not shown) be arranged inside the mold (400).

The fixing pin is so arranged as to maintain a gap among the ring-shaped body units (12a, 12b, 12c, 12d), and it should be apparent that the number of fixing pins and arrangement of fixing pins may be selectively determined based on operational environments and the arrangement of body units (12a, 12b, 12c, 12d).

Furthermore, the fixing pin is a fixing member of a substantially cylindrical shape formed to an axial direction of the bus bar (200). The fixing pin is preferably formed with a metal material that is axially, that is, vertically and penetratingly arranged in a gap among the body units (12a, 12b, 12c, 12d) in a mold. However, it should be also apparent that the fixing pin may be axially formed with a predetermined length sufficient enough to fix the position without penetrating the entire body unit.

To be more specific, the fixing pin, sequentially and to a circumferential direction from inside of the mod (400), includes a first pin (not shown) arranged between the innermost first body unit (12a) and an adjacent second body unit (12b), a second pin (not shown) arranged between the second pin and the third pin (12c), and a third pin (not shown) arranged between the third body unit (12c) and the fourth body unit (12d).

The first, second and third pins are a plurality of fixing pins arranged on the same circumference, and more than three or more pins for each of first, second and third pins are arranged for position fixing of the body units (12a, 12b, 12c, 12d).

Furthermore, each of the terminals (211a, 211b, 211c, 211d) is protrusively bent from the ring-shaped body units (12a, 12b, 12c, 12d) to the circumferential direction, such that the fixing pins are arranged on bent positions of the terminals (211a, 211b, 211c, 211d) to fix a gap among the terminals (211a, 211b, 211c, 211d). Thus, the number of fixing pins is preferably determined by the number of bent positions.

It should be noted that the present disclosure is advantageous in that the sequential arrangement of body units (12a, 12b, 12c, 12d) in the mold (400) can properly maintain a gap among the body units (12a, 12b, 12c, 12d), and a gap among the terminals (211a, 211b, 211c, 211d) can be accurately positioned in the insert molding process.

FIG. 8 is a lateral view illustrating a bus bar of an EPS motor in which a pin hole is formed in the insulator as a result of insert molding process by the fixing pin according to the present disclosure, and FIG. 5 is a plan of the result viewed from an upper surface. As mentioned above, the first pin of the mold (400) corresponds to a first pin hole (31a) of the insulator, the second pin corresponds to a second pin hole (31b), and the third pin corresponds to a third pin hole (31c).

Figure 9:
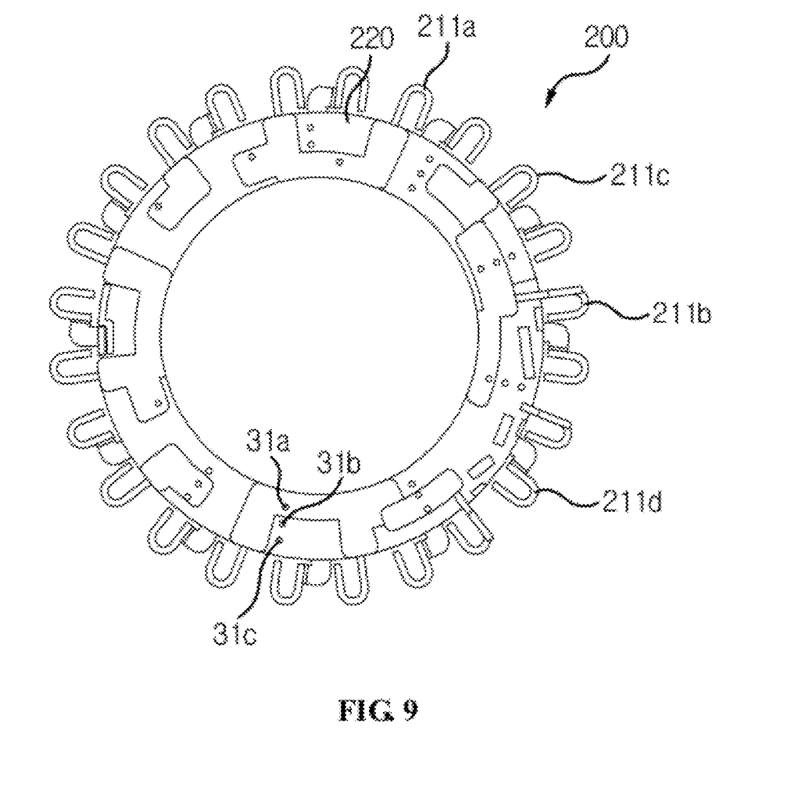
FIG. 9 is a plan view illustrating a bus bar of an EPS motor according to the present disclosure.

As illustrated in the drawings, the pin holes (31a, 31b, 31c) arranged on three circumferences are adequately positioned on places of discrete areas of the body units (12a, 12b, 12c, 12d) and bent units of the terminals (211a, 211b, 211c, 211d).

Therefore, a stopper function of restricting the radial movement of the body units (12a, 12b, 12c, 12d) and circumferential movement by being positioned at the bent units of the terminals (211a, 211b, 211c, 211d) can resultantly inhibit the undesirable electrical connection among the terminals (211a, 211b, 211c, 211d) to enhance the reliability in manufacturing process and to guarantee an operational reliability of the motor at the same time.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A bus bar of an EPS motor, the bus bar comprising:
an insulator made of insulation material and configured to form a body of the bus bar for supplying an electric power with at least three or more different polarities to a coil wound on a stator of the motor, the insulator being coupled to an upper side of the stator;
a first terminal having a plurality of first coil terminal connectors protrusively formed to a circumferential direction at a first height of a periphery of the insulator;
a second terminal having a plurality of second coil terminal connectors protrusively formed at the periphery of the insulator to a circumferential direction at a second height higher than the first height; and
a fixing unit interposed between the first and second terminals in the insulator to fix an arrangement position of the first and second terminals arranged inside the insulator;
wherein the first terminal includes a ring-shaped first body arranged inside the insulator and formed by bending a plate material of a predetermined thickness and connecting both distal ends of the plate material, and wherein the plurality of first coil terminal connectors is bent at both distal ends by being extended from the first body;
wherein the second terminal includes ring-shaped second to fourth bodies in the form of a partial round bent section, wherein both distal ends of each of the ring-shaped second to fourth bodies are mutually distanced inside the insulator such that each of the ring-shaped second to fourth bodies is opened, and wherein the plurality of second coil terminal connectors is bent at a distal end by being extended from the second to fourth bodies; and
wherein the first and second coil terminal connectors are alternately formed so as not to face each other.

2. The bus bar of claim 1, wherein the insulator takes a ring shape with a hollow hole formed at a center, wherein an inner diameter of the insulator corresponds to a diameter of a rotor coupled to a center of the stator, and wherein an outer diameter of the insulator corresponds to an external diameter of the stator.

3. The bus bar of claim 1, wherein the first terminal is arranged at a position higher than a floor surface of the insulator and the second terminal is arranged at a position lower than an upper surface of the insulator.

4. The bus bar of claim 1, wherein distal ends of the first and second coil terminal connectors are spaced apart from the periphery of the insulator, each at a same distance.

5. The bus bar of claim 1, wherein the insulator is injection molded of resin material along with the first and second terminals.

6. The bus bar of claim 1, wherein the fixing unit includes a plurality of pin holes formed at the insulator, wherein the pin holes are formed by a plurality of pins provided at a mold injection-molding the insulator to fix an inner position of the insulator of the first to fourth bodies.

7. The bus bar of claim 6, wherein the pin holes are formed by passing through the upper surface and the lower surface of the insulator.

8. The bus bar of claim 1, wherein the second body is applied with an electric power of first polarity, the third body is applied with an electric power of second polarity, and each diameter of the second to fourth bodies is differently formed.

9. The bus bar of claim 8, wherein a diameter of the third body is the largest while a diameter of the first body is the smallest.

10. The bus bar of claim 8, wherein the first body is bent at least thrice to form the first coil terminal connector, and the second and third bodies are bent at least twice to form the second coil terminal connector.

11. An EPS motor, comprising:
a stator wound with a coil;
a rotor installed at a space centrally formed at the stator, and rotating inside a space by an electrical interaction between a plurality of magnets and the coil of the stator; and
a bus bar coupled to an upper side of the stator, and supplying an electric power having at least three or more mutually different polarities to the coil wound on the stator,
wherein the bus bar comprises:
an insulator made of insulation material and configured to form a body of the bus bar for supplying an electric power with at least three or more different polarities to the coil wound on the stator, the insulator being coupled to an upper side of the stator;
a first terminal having a plurality of first coil terminal connectors protrusively formed to a circumferential direction at a first height of a periphery of the insulator;
a second terminal having a plurality of second coil terminal connectors protrusively formed at the periphery of the insulator to a circumferential direction at a second height higher than the first height; and
a fixing unit interposed between the first and second terminals in the insulator to fix an arrangement position of the first and second terminals arranged inside the insulator;
wherein the first terminal includes a ring-shaped first body arranged inside the insulator and formed by bending a plate material of a predetermined thickness and connecting both distal ends of the plate material, and wherein the plurality of first coil terminal connectors is bent at both distal ends by being extended from the first body;
wherein the second terminal includes ring-shaped second to fourth bodies in the form of a partial round bent section, wherein both distal ends of each of the ring-shaped second to fourth bodies are mutually distanced inside the insulator such that each of the ring-shaped second to fourth bodies is opened, and wherein the plurality of second coil terminal connectors is bent at a distal end by being extended from the second to fourth bodies; and
wherein the first and second coil terminal connectors are alternately formed so as not to face each other.

12. The EPS motor of claim 11, wherein the insulator takes a ring shape with a hollow hole formed at a center, wherein an inner diameter of the insulator corresponds to a diameter of a rotor coupled to a center of the stator, and wherein an outer diameter of the insulator corresponds to an external diameter of the stator.

13. The EPS motor of claim 11, wherein the first terminal is arranged at a position higher than a floor surface of the insulator and the second terminal is arranged at a position lower than an upper surface of the insulator.

14. The EPS motor of claim 11, wherein distal ends of the first and second coil terminal connectors are spaced apart from the periphery of the insulator, each at a same distance.

15. The EPS motor of claim 11, wherein the insulator is injection molded of resin material along with the first and second terminals.

16. The EPS motor of claim 11, wherein the fixing unit includes a plurality of pin holes formed at the insulator, wherein the pin holes are formed by a plurality of pins provided at a mold injection-molding the insulator to fix an inner position of the insulator of the first to fourth bodies.

17. The EPS motor of claim 16, wherein the pin holes are formed by passing through the upper surface and the lower surface of the insulator.

18. The EPS motor of claim 11, wherein the second body is applied with an electric power of first polarity, the third body is applied with an electric power of second polarity, and each diameter of the second to fourth bodies is differently formed.

19. The EPS motor of claim 16, wherein a diameter of the third body is the largest, while a diameter of the first body is the smallest.

20. The EPS motor of claim 16, wherein the first body is bent at least thrice to form the first coil terminal connector, and the second and third bodies are bent at least twice to form the second coil terminal connector.

* * * * *